United States Patent
Kabashima et al.

(10) Patent No.: US 10,372,053 B2
(45) Date of Patent: Aug. 6, 2019

(54) RECORDED MATERIAL AND IMAGE FORMING METHOD

(71) Applicant: CANON KABUSHIKI KAISHA, Tokyo (JP)

(72) Inventors: Toru Kabashima, Moriya (JP); Shuhei Takahashi, Chiba (JP); Shuichi Tamura, Moriya (JP); Shinichirou Yoshikawa, Nagareyama (JP); Toshihiko Sugimoto, Yokohama (JP); Erito Machida, Ebina (JP); Junji Ito, Hiratsuka (JP); Jiro Ishizuka, Moriya (JP); Yuji Nakayama, Kashiwa (JP); Koji Amemiya, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 230 days.

(21) Appl. No.: 15/386,645

(22) Filed: Dec. 21, 2016

(65) Prior Publication Data
US 2017/0102628 A1 Apr. 13, 2017

Related U.S. Application Data

(63) Continuation of application No. PCT/JP2016/065687, filed on May 27, 2016.

(30) Foreign Application Priority Data

May 27, 2015 (JP) ................................ 2015-107667

(51) Int. Cl.
*G03G 9/08* (2006.01)
*G03G 13/10* (2006.01)
(Continued)

(52) U.S. Cl.
CPC ............. *G03G 9/0825* (2013.01); *B32B 3/10* (2013.01); *G03G 9/0819* (2013.01); (Continued)

(58) Field of Classification Search
CPC . G03G 9/12; G03G 9/13; G03G 9/131; Y10T 428/24802; Y10T 428/24901
See application file for complete search history.

(56) References Cited

U.S. PATENT DOCUMENTS 5,045,420 A 9/1991 Hosono et al.
5,364,726 A * 11/1994 Morrison ................. G03G 9/12
430/115

(Continued)

FOREIGN PATENT DOCUMENTS

EP 0 455 343 11/1991
EP 1 884 834 2/2008
(Continued)

OTHER PUBLICATIONS

U.S. Appl. No. 15/280,065, Hiroshi Tanabe, filed Sep. 29, 2016.

*Primary Examiner* — Gerard Higgins
(74) *Attorney, Agent, or Firm* — Venable LLP

(57) ABSTRACT

Provided is a recorded material in which a recording liquid is satisfactorily fixed to a recording medium and which has a sufficient chroma and a sufficient lightness, in high-speed printing. The recorded material comprises a recording medium, a toner particle including colorant particles, and a cured resin including the toner particle and fixing a toner image formed of the toner particle onto the recording medium, wherein an average circularity of the toner particle is not less than 0.70 and not more than 0.99, the toner particle is not exposed from a surface of the cured resin, and an average distance between wall surfaces of the adjacent toner particles is not less than 10 nm and less than 125 nm.

5 Claims, 13 Drawing Sheets

(51) Int. Cl.
  *B32B 3/10* (2006.01)
  *G03G 9/13* (2006.01)
  *G03G 9/09* (2006.01)
  *G03G 9/12* (2006.01)
  *G03G 9/135* (2006.01)
  *G03G 15/08* (2006.01)
  *G03G 9/087* (2006.01)
  *G03G 9/125* (2006.01)

(52) U.S. Cl.
  CPC ....... *G03G 9/0827* (2013.01); *G03G 9/08722* (2013.01); *G03G 9/0918* (2013.01); *G03G 9/122* (2013.01); *G03G 9/125* (2013.01); *G03G 9/13* (2013.01); *G03G 9/132* (2013.01); *G03G 9/135* (2013.01); *G03G 9/1355* (2013.01); *G03G 13/10* (2013.01); *G03G 15/08* (2013.01); *G03G 2215/0129* (2013.01); *Y10T 428/24802* (2015.01); *Y10T 428/24901* (2015.01)

(56) References Cited

U.S. PATENT DOCUMENTS

| | | |
|---|---|---|
| 5,395,724 A | 3/1995 | Morrison et al. |
| 5,620,783 A | 4/1997 | Takeuchi et al. |
| 7,974,554 B2 * | 7/2011 | Schleusener ........... G03G 9/125 399/231 |
| 8,080,356 B2 | 12/2011 | Teshima |
| 2010/0055602 A1 | 3/2010 | Teshima |
| 2010/0136474 A1 | 6/2010 | Iwase et al. |
| 2010/0136475 A1 | 6/2010 | Iwase et al. |
| 2011/0183254 A1 | 7/2011 | Shoshi et al. |
| 2015/0192875 A1 | 7/2015 | Ito et al. |
| 2016/0349637 A1 | 12/2016 | Hasegawa et al. |
| 2016/0349651 A1 | 12/2016 | Ito et al. |
| 2016/0349652 A1 | 12/2016 | Natori et al. |
| 2016/0349653 A1 | 12/2016 | Tanabe et al. |
| 2016/0349655 A1 | 12/2016 | Natori et al. |
| 2016/0349656 A1 | 12/2016 | Hasegawa et al. |
| 2016/0349676 A1 | 12/2016 | Takahashi et al. |

FOREIGN PATENT DOCUMENTS

| | | |
|---|---|---|
| JP | H04-336543 | 11/1992 |
| JP | H06-236078 | 8/1994 |
| JP | 2003-057883 | 2/2003 |
| JP | 2009-258591 | 11/2009 |
| JP | 2010-060849 | 3/2010 |
| JP | 2012-141463 | 7/2012 |
| JP | 2013-152348 | 8/2013 |
| WO | 2006/126566 | 11/2006 |
| WO | 2007/000974 | 1/2007 |
| WO | 2007/000975 | 1/2007 |
| WO | 2007/108485 | 9/2007 |

* cited by examiner

RECORDED MATERIAL AND IMAGE FORMING METHOD

TECHNICAL FIELD

The present invention relates to a recorded material and an image forming method.

BACKGROUND ART

At present, in a POD (Print On Demand) market, a printer which satisfies the need for higher-speed and higher-quality image formation is in demand.

Recent printers use a method in which a recording liquid (ink) contains a UV curing agent so that drying with heat is not used. This has achieved delivery time shorter than achieved with conventional methods. Such a printer using a UV curing agent uses a method which irradiates the UV curing agent with UV light to cure the UV curing agent. However, depending on a recording medium (media) or image forming conditions, the fixation property of a recording liquid with respect to a recording medium may deteriorate.

PTL 1 discloses a technique which applies pressure/heat to a recording liquid (developer) using a heat roll before the recording liquid is cured with UV light to improve the fixation property.

CITATION LIST

Patent Literature

[PTL 1] Japanese Patent Application Laid-open No. 2003-57883

SUMMARY OF INVENTION

Technical Problem

However, in the technique disclosed in PTL 1, the shape of a toner particle in the recording liquid is flattened under the pressure applied by the heat roll. This causes the problem that a toner image does not necessarily have a sufficient lightness.

An object of the present invention established in view of the foregoing problem is to provide a recorded material in which, even when high-speed image formation is performed, a toner image (recording liquid) is satisfactorily fixed onto a recording medium and which has the toner image having a sufficient chroma and a sufficient lightness. Another object of the present invention is to provide an image forming method which allows such a recorded material to be obtained.

Solution to Problem

The present invention provides a recorded material including a recording medium; a toner particle including colorant particles; and a cured resin including the toner particle and fixing a toner image formed of the toner particle onto the recording medium, wherein an average circularity of the toner particle is not less than 0.70 and not more than 0.99, the toner particle is not exposed from a surface of the cured resin, and an average distance between wall surfaces of the adjacent toner particles is not less than 10 nm and less than 125 nm.

The present invention also provides an image forming method including an electrostatic latent image forming step of forming an electrostatic latent image on an image carrier; a developing step of developing the electrostatic latent image using a recording liquid including a toner particle including colorant particles and an energy-curable liquid, to form a toner image formed of the toner particle on the image carrier; a transfer step of transferring the toner image formed of the toner particle and the energy-curable liquid from the image carrier onto a recording medium; and a fixing step of fixing the toner image onto the recording medium without applying a pressure thereto, by giving an energy to the energy-curable liquid to cure the energy-curable liquid.

Advantageous Effects of Invention

The present invention can provide a recorded material in which, even when high-speed image formation is performed, a toner image (recording liquid) is satisfactorily fixed onto a recording medium and which has the toner image having a sufficient chroma and a sufficient lightness. The present invention can also provide an image forming method which allows such a recorded material to be obtained.

DESCRIPTION OF EMBODIMENTS

Figure 1:
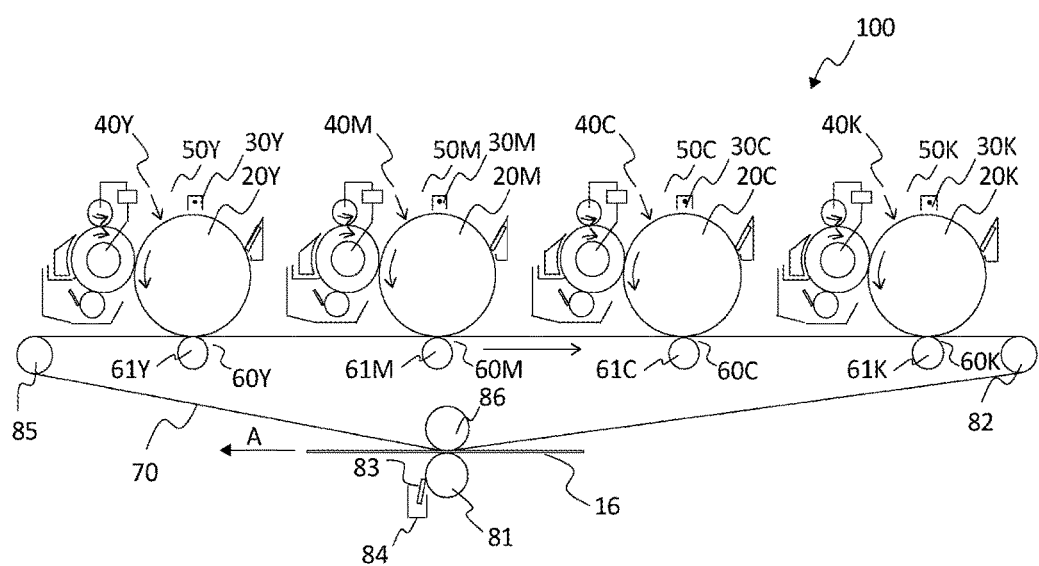
FIG. 1 is a schematic diagram of an image forming device according to EXAMPLE 1.

In the present invention, the wording "not less than . . . and not more than -" or "from . . . to -" means a range of numerical values including a lower limit and an upper limit as end points unless otherwise noted.

A recorded material in the present invention is a recording material including a recording medium; a toner particle including colorant particles; and a cured resin including the toner particle and fixing a toner image formed of the toner particle onto the recording medium, wherein an average circularity of the toner particle is not less than 0.70 and not more than 0.99, the toner particle is not exposed from a surface of the cured resin, and an average distance between wall surfaces of the adjacent toner particles is not less than 10 nm and less than 125 nm.

Also, an image forming method in the present invention includes an electrostatic latent image forming step of forming an electrostatic latent image on an image carrier; a developing step of developing the electrostatic latent image using a recording liquid including a toner particle including colorant particles and an energy-curable liquid, to form a toner image formed of the toner particle on the image carrier; a transfer step of transferring the toner image formed of the toner particle and the energy-curable liquid from the image carrier onto a recording medium; and a fixing step of fixing the toner image onto the recording medium without applying a pressure thereto, by giving an energy to the energy-curable liquid to cure the energy-curable liquid.

Preferably, a recording liquid (and the energy-curable liquid included in the recording liquid) includes a cationic polymerizable monomer.

Referring to the drawings, the following will describe specific examples (EXAMPLES) of the embodiment of the present invention. However, the present invention is not limited to EXAMPLES shown below.

FIG. 1 is a schematic diagram of an example of an image forming device using an image forming method in the present invention, which is an image forming device according to EXAMPLE 1 described later. Specifically, FIG. 1 is a cross-sectional view (schematic diagram) of a printer using electrophotography as a type of an image forming device, which is a cross-sectional view along the direction of transportation of a sheet. In the following description, the printer using electrophotography is also referred to simply as the "printer".

EXAMPLE 1

Figure 2:
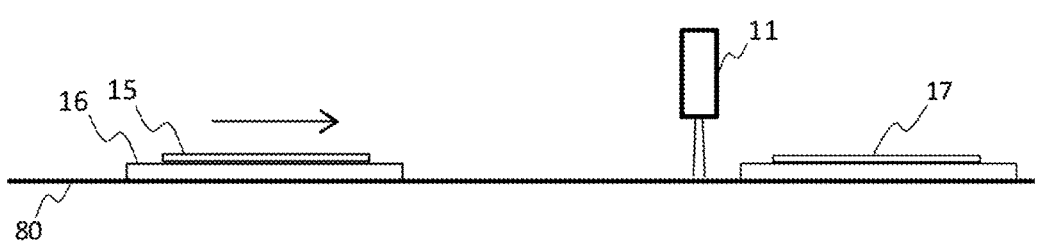
FIG. 2 is a schematic diagram of a fixing unit according to EXAMPLE 1.

FIG. 1 is a schematic diagram (cross-sectional view) of the image forming device according to EXAMPLE 1. FIG. 2 is a schematic diagram (cross-sectional view) of a fixing unit according to EXAMPLE 1. The Y, M, C, and K in reference numerals respectively mean that the members denoted by the reference numerals are for yellow, magenta, cyan, and black colors. In the following description, the Y, M, C, and K in the reference numerals may also be omitted.

An image forming device 100 has photosensitive drums (electrophotographic photoreceptors) 20 each as an image carrier. Around the photosensitive drums 20, charging units (primary chargers) 30, a developing unit, a transfer unit (intermediate transfer belt) 70, and a cleaning unit are disposed. A recording medium 16 is supplied with appropriate timing to the respective abutting portions (transfer nip portions) of the transfer unit and the photosensitive drums 20.

In EXAMPLE 1, the diameter of each of the photosensitive drums 20 (20Y, 20M, 20C, and 20K) is 84 mm. Each of the photosensitive drums 20 is driven to rotate at a peripheral speed (process speed) of 750 mm/second in the direction shown by the arrow A in FIG. 1. Then, each of the photosensitive drums 20 has a surface uniformly charged by the charging units 30 in the process of rotating. Then, by exposure light 40 irradiated from an exposing unit (not shown), electrostatic latent images of individual colors each corresponding to an image exposure pattern are formed on the respective surfaces of the photosensitive drums 20 (electrostatic latent image forming step).

The developing unit has a recording liquid including negatively charged (nega-charged) toner particles and an energy-curable liquid (carrier liquid) and transports the recording liquid carried by a development sleeve to the photosensitive drums 20. Using development electric fields formed by the voltage (development bias) applied to the development sleeve and the surface potentials of the photosensitive drums 20, the developing unit allows the toner particles in the recording liquid to be attached to the electrostatic latent image on each of the photosensitive drums 20 and thus visualizes the electrostatic latent image as a toner image (developing step).

The toner images are primarily transferred onto the intermediate transfer belt 70 at abutting portions 60 between the photosensitive drums 20 and primary transfer rollers 61.

The recording medium 16 is carried by a transfer belt 80 and supplied with appropriate timing to the abutting portions of the intermediate transfer belt 70 and a secondary transfer outer roller 81. A secondary transfer inner roller 86 faces the secondary transfer outer roller 81 with the intermediate transfer belt 70 (and the recording medium 16) being interposed therebetween. The toner images are secondarily transferred from the intermediate transfer belt 70 onto the recording medium 16. By the foregoing primary transfer and the secondary transfer, the toner images each formed of the toner particle and the energy-curable liquid described above are transferred from the photosensitive drums 20 onto the recording medium 16 (transfer step).

As shown in FIG. 2, the recording medium 16 carrying the recording liquid 15 including the unfixed toner images and the energy-curable liquid is transported by the transfer belt 80 to an irradiation position in an irradiating unit 11 serving as the fixing unit.

At this time, by the heat from a pretreatment unit (not shown) which accelerates the curing reaction of the energy-curable liquid and the energy of the UV light irradiated from an irradiating unit 11, the energy-curable liquid is cured to become a cured resin. By the cured resin, the unfixed toner images are fixed onto the recording medium 16 (fixing step). The fixing step fixes the toner images onto the recording medium without applying a pressure thereto. Then, the recording medium 16 is discharged to the outside of the image forming device.

Note that the pretreatment unit need not be used depending on the curing property of the energy-curable liquid. In the present invention, it is preferable that heating is not performed in the fixing step. The temperature in the fixing step is preferably not more than a glass transition temperature (Tg) in terms of preventing the deformation of the toner particle. For example, the temperature in the fixing step is preferably 23 to 70° C.

In the present invention, it is preferable that the energy-curable liquid is a UV-curable liquid and the foregoing fixing step is the step of fixing the toner images onto the recording medium without applying a pressure thereto, by irradiating the energy-curable liquid with UV light to cure the energy-curable liquid.

In the primary transfer step, the untransferred toner particle and energy-curable liquid that have not been transferred onto the intermediate transfer belt 70 and have remained on each of the photosensitive drums 20 are removed by a cleaning unit. Each of the photosensitive drums 20 having a surface from which the untransferred toner particle and energy-curable liquid have been removed is subjected to the formation of the next image.

FIG. 1 is an outline view using a 4-station image forming system as an example. However, the present invention can correspond also to a 1-station image forming system or a multi-color image forming system.

Next, a description will be given of the recording liquid (developer) used in the present invention. The recording liquid includes the toner particles and the energy-curable liquid (carrier liquid).

Figure 3:
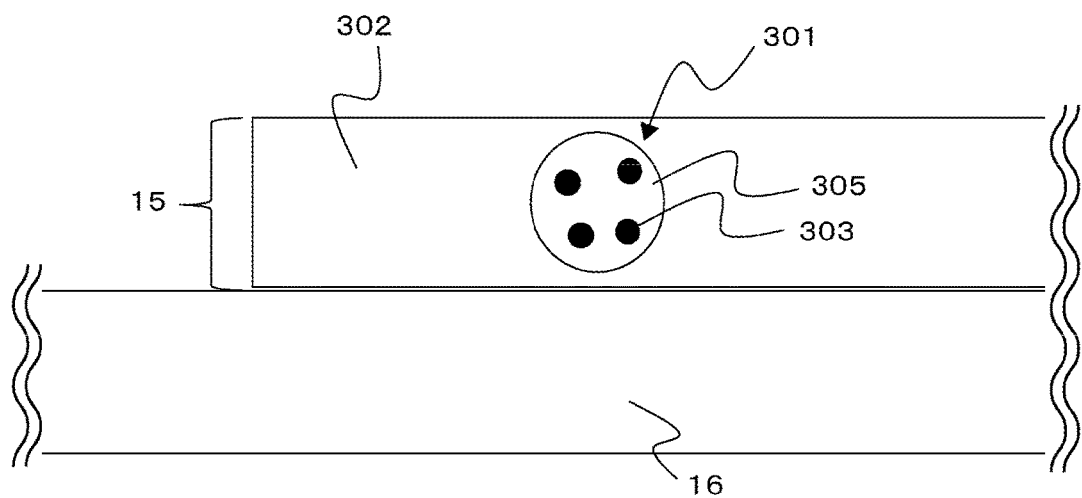
FIG. 3 is a conceptual cross-sectional view before fixation according to EXAMPLE 1.

FIG. 3 is a cross-sectional view before fixation after the toner particle (toner image formed of the toner particle) and the energy-curable liquid were transferred onto the recording medium.

A toner particle 301 includes colorant particles 303 which produce a color. The toner particle 301 also contains a binder resin (toner resin) 305 for binding the colorant particles 303. The toner particle 301 may also contain another material such as a charge control agent not shown in addition to the binder resin 305 and the colorant particles 303.

As an example of a method of producing the toner particle 301, a coacervation method may be cited in which, while the colorant particles are dispersed and monomers for the binder resin are gradually polymerized to form the toner particle, the colorant particles are caused to be included in the toner particle. Instead, a method such as a grinding method in which the binder resin or the like is melted and the colorant particles are caused to be included in the binder resin can also be used.

The details of the foregoing coacervation method are described in, e.g., Re-publication of PCT International Publications (WO 2007/000974 and WO 2007/000975). Also, the details of the foregoing wet grinding method are described in e.g., Re-publication of PCT International Publications (WO 2006/126566 and WO 2007/108485). In the present invention, such known methods are usable.

The following will show a method of producing a developer in EXAMPLE 1.

<Synthesis of Pigment Dispersant>

100 parts by mass of a toluene solution (50% solid content) of a polycarbodiimide compound having an isocyanate group and a carbodiimide equivalent weight of 262 and 8.5 parts by mass of N-methyldiethanol amine were prepared and allowed to stand at about 100° C. for 3 hours to cause a reaction between the isocyanate group and a hydroxyl group. Then, 39.6 parts by mass of a self-polycondensate of ε-carprolactone having a carboxyl group at the end and a number average molecular weight of 8500 was prepared and allowed to stand at about 80° C. for two hours to cause a reaction between a carbodiimide group and the carboxyl group. Then, by distilling away toluene under reduced pressure, a pigment dispersant (100% solid content) having a number average molecular weight of about 13000 was obtained.

<Pigment Dispersing Step>

10 parts by mass of a pigment (Carbon Black MA-7 available from Mitsubishi Chemical Corporation), 10 parts by mass of the pigment dispersant, and 80 parts by mass of a solvent (tetrahydrofuran, THF) were mixed together and kneaded in a paint shaker using steel beads having a diameter of 5 mm for 1 hour to obtain Kneaded Material 1.

60 parts by mass of Kneaded Material 1 obtained above, 80 parts by mass of a 50% THF solution of Polyester Resin 1 (in which Molecular Ratio between polyoxypropylene (2.0)-2,2-bis(4-hydroxyphenyl)propane, a terephthalic acid, and a treimellitic acid was 50:40:10, Tg was 59° C., Tm was 105° C., a SP value was 11.2 $(cal/cm^3)^{1/2}$, an acid value was 18 KOHmg/g, a weight average molecular weight was $2.5 \times 10^4$), and 12 parts by mass of a toner particle disperser (AJISPER PB-817 available from AJINOMOTO Fine-Techno Co., Inc.) were mixed together in a high-speed disperser (T.K. Robomix/T.K. Homo Disper 2.5-type blade available from PRIMIX Corporation) and blended while stirring the mixture at 40° C. to provide Pigment Dispersion Liquid 1.

<Mixing Step>

To Pigment Dispersion Liquid 1 (100 parts by mass) obtained above, 200 parts by mass of dodecyl vinyl ether (DDVE) was added in small amounts, while high-speed stirring (at a rotation speed of 25000 rpm) was performed using a homogenizer (Ultra Turrax T50 available from IKA Japan K.K.), so that Solution Mixture 1 was obtained.

At the end of the mixing step, a binder resin was in a phase-separated state.

<Distilling-Away Step>

Solution Mixture 1 was moved into an eggplant flask. From Solution Mixture 1, THF was completely distilled away at 50° C., while ultrasonic dispersion was performed, so that UV-curable liquid Toner Particle Dispersion 1 containing the toner particle in a UV-curable insulating liquid was obtained.

<Liquid Developer Preparing Step>

Toner Particle Dispersion 1 (10 parts by mass) obtained was subjected to centrifugal separation treatment. The supernatant solution was removed by decantation, and new DDVE having the same mass as that of the removed supernatant solution was added to the residue, which was dispersed again. The resultant mixture was subjected to re-dispersion and 0.10 parts by mass of Lecinol S-10 (hydrogenated lecithin available from Nikko Chemicals Co., Ltd.), 10 parts by mass of dodecyl vinyl ether as a polymerizable liquid monomer, 80 parts by mass of cyclohexanedimethanol divinyl ether, 0.30 parts by mass of a photopolymerization initiator given by Formula (3) shown below, and 1 part by mass of KAYAKURE-DETX-S (available from Nippon Kayaku Co., Ltd.) were added to the mixture to obtain UV-curable Liquid Developer 1. The time required for the production was not longer than 12 hours.

Examples of the binder resin used for the toner particle include a polyester resin, an epoxy-based resin, a styrene acrylic resin, and the like.

As the colorant particles used for the toner particle, a typical organic or inorganic pigment can be used. To increase the dispersibility of the toner particle, a dispersant or a synergist can also be used in the production process. The content of the colorant in the toner particle is preferably not less than 5 parts by mass and not more than 100 parts by mass based on 100 parts by mass of the binder resin.

As an example of the pigment, carbon black may be cited. As an example of a pigment which produces a blue or cyan color, the following may be cited: C.I. Pigment Blue 2, 3, 15:2, 15:3, 15:4, 16, or 17; C.I. Vat Blue 6; C.I. Acid Blue 45; or a copper phthalocyanine pigment having a phthalocyanine skeleton and 1 to 5 phthalimide methyl groups as substituents.

Preferably, the toner particle includes a pigment dispersant. As a dispersion aid, a synergist in accordance with each of the pigments can also be used. A preferred content of each of the pigment dispersant and the pigment dispersion aid is 0.01 to 50 mass in the toner particle. As the pigment dispersant, a known pigment dispersant can be used. Examples of the dispersant include a hydroxyl-group-containing carboxylic acid ester, a salt of a long-chain polyaminoamide and a high-molecular-weight acid ester, a salt of a high-molecular-weight polycarboxylic acid, a high-molecular-weight unsaturated acid ester, a high-molecular-weight copolymer, a modified polyacrylate, an aliphatic multivalent carboxylic acid, a formalin condensate of a naphthalene sulfonic acid, a polyoxyethylene alkyl phosphate, a pigment derivative, and the like. Examples of the dispersant also include a commercially available polymer dispersant such as a Solsperse series available from Lubrizol Japan Limited.

Preferably, an energy-curable liquid 302 contains a charge control agent which causes the surface of the toner particle to have charges, a photopolymerization initiator which generates an acid when irradiated with UV light, and monomers which are bound to each other by the acid. Each of the monomers which are bound to each other by the acid is preferably a vinyl ether compound which is polymerized through a cationic polymerization reaction.

The energy-curable liquid 302 may also contain a sensitizer in addition to the photopolymerization initiator. To suppress the degradation of a keeping quality due to photopolymerization, the energy-curable liquid 302 preferably contains not less than 10 ppm and not more than 5000 ppm of a cationic polymerization inhibitor. Besides, the energy-curable liquid 302 may also contain a charge control adjuvant, another additive, or the like.

The monomers (cationic polymerizable monomers/UV curing agent) contained in the energy-curable liquid 302 are a mixture of a monofunctional monomer having one vinyl ether group (compound shown by Formula (1) below) and a bifunctional monomer having two vinyl ether groups (compound shown by Formula (2) below).

The photopolymerization initiator contained in the energy-curable liquid 302 is a compound shown by Formula (3) below. The content of the photopolymerization initiator is 0.3 mass % based on the total mass of the foregoing monomers (cationic polymerizable monomers/UV curing agent). By using the photopolymerization initiator, it is possible to obtain a high-resistance recording liquid, while allowing excellent fixation, unlike in the case where an ionic photo-acid-generating agent is used.

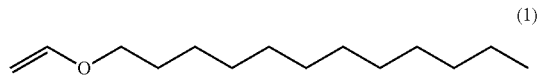

(1)

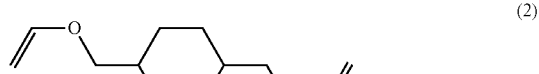

(2)

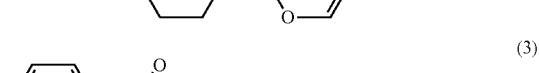

(3)

In the present invention, the photopolymerization initiator given by the following Formula (6) is used preferably.

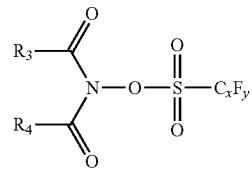

(in Formula (6), $R_3$ and $R_4$ are bound to each other to form a ring structure, x represents an integer of 1 to 8, and y represents an integer of 3 to 17.)

Examples of the foregoing ring structure include a 5-membered ring or a 6-membered ring. The specific examples thereof include a succinimide structure, a phthalimide structure, a norbornene dicarboximide structure, a naphthalene dicarboximide structure, a cyclohexane dicarboximide structure, an epoxycyclohexene dicarboximide structure, and the like. Such a ring structure may also have, as a substituent group, an alkyl group with 1 to 4 carbons, an alkyloxy group with 1 to 4 carbons, an alkylthio group with 1 to 4 carbons, an aryl group with 6 to 10 carbons, an aryloxy group with 6 to 10 carbons, an arylthio group with 6 to 10 carbons, or the like.

As an example of $C_xF_y$ in formula (6), a straight-chain alkyl group (RF1) in which a hydrogen atom is substituted with a fluorine atom, a branched-chain alkyl group (RF2) in which a hydrogen atom is substituted with a fluorine atom, a cycloalkyl group (RF3) in which a hydrogen atom is substituted with a fluorine atom, or an aryl group (RF4) in which a hydrogen atom is substituted with a fluorine atom may be cited.

Examples of the straight-chain alkyl group (RF1) in which a hydrogen atom is substituted with a fluorine atom include a trifluoromethyl group (x=1, y=3), a pentafluoroethyl group (x=2, y=5), a nonafluorobutyl group (x=4, y=9), a perfluorohexyl group (x=6, y=13), a perfluorooctyl group (x=8, y=17), and the like.

Examples of the branched-chain alkyl group (RF2) in which a hydrogen atom is substituted with a fluorine atom include a perfluoroisopropyl group (x=3, y=7), a perfluoro-tert-butyl group (x=4, y=9), a perfluoro-2-ethylhexyl group (x=8, y=17), and the like.

Examples of the cycloakyl group (RF3) in which a hydrogen atom is substituted with a fluorine atom include a perfluorocyclobutyl group (x=4, y=7), a perfluorocyclopentyl group (x=5, y=9), a perfluorocyclohexyl group (x=6, y=11), a perfluoro(1-cyclohexyl)methyl group (x=7, y=13) and the like.

Examples of the aryl group (RF4) in which a hydrogen atom is substituted with a fluorine atom include a pentafluorophenyl group (x=6, y=5), a 3-trifluoromethyl-tetrafluoro phenyl group (x=7, y=7), and the like.

The content of the photopolymerization initiator is not particularly limited, but is preferably 0.01 to 5 parts by mass on the basis of 100 parts by mass of the cationic polymerizable monomer (preferably a vinyl ether compound).

Preferably, the foregoing cationic polymerizable monomer is at least one compound selected from the group consisting of dodecyl vinyl ether, dipropylene glycol divinyl ether, dicyclopentadiene vinyl ether, cyclohexane dimethanol divinyl ether, tricyclodecane vinyl ether, trimethylolpropane trivinyl ether, 2-ethyl-1,3-hexanediol divinyl ether, 2,4-diethyl-1,5-pentanediol divinyl ether, 2-butyl-2-ethyl-1,3-propanediol divinyl ether, neopentyl glycol divinyl ether, pentaerythritol tetra vinyl ether, and 1,2-decanediol divinyl ether.

Figure 4:
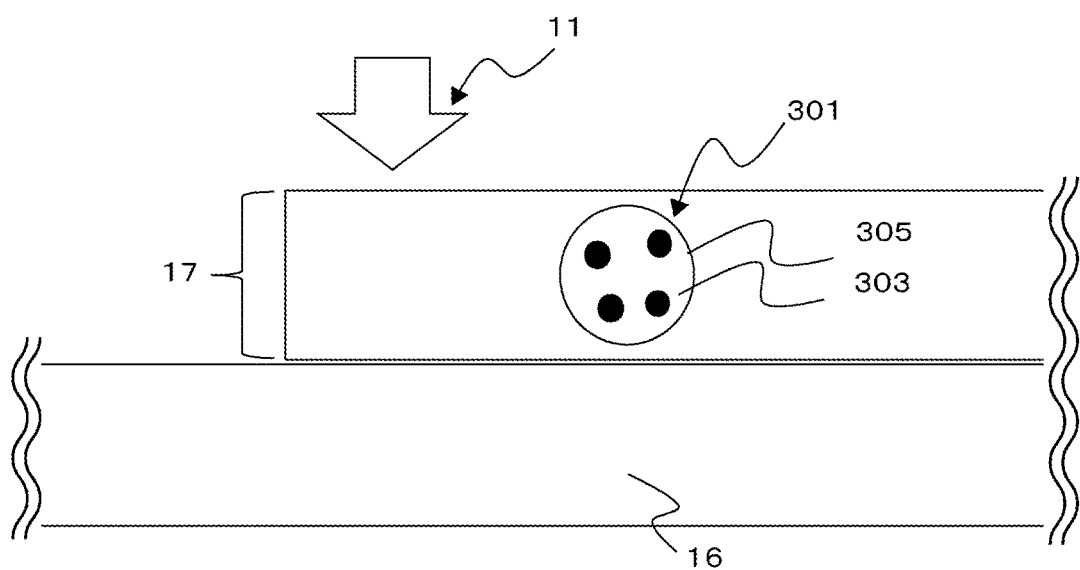
FIG. 4 is a conceptual cross-sectional view after fixation according to EXAMPLE 1.

FIG. 4 is a conceptual cross-sectional view after fixation after the energy-curable liquid was irradiated with UV light.

When the energy-curable liquid 302 is irradiated with a predetermined amount of UV light at a wavelength of, e.g., 365 to 410 nm, the energy-curable liquid 302 undergoes a polymerization reaction to be cured.

A description will be given of the fixing unit.

In the case where the energy-curable liquid is a UV-curable liquid, when the UV-curable liquid (carrier) is irradiated with the UV light, a unit having, e.g., a mercury lamp, a UV laser, a UV-LED, or the like can be used.

The cumulative irradiation energy of the UV light is preferably not less than 0.1 mJ/cm$^2$ and not more than 1000 mJ/cm$^2$.

In the present embodiment, as a UV irradiating unit, an LED (Light Emitting Diode) which emits UV light is used as a light source.

What is important in a UV curing reaction is the first law of photochemistry (the Grotthuss-Draper law), i.e., that "of the projected light quantity, only the absorbed light brings about a photochemical change". That is, in the UV curing, the coincidence between the absorption wavelength of the photopolymerization initiator and the light emission wavelength of the UV irradiating unit is important. Major examples of the LEDs include LED light sources which have peak illuminances at wavelengths of 365±5 nm, 385±5 nm, 405±5 nm, and the like. Accordingly, the absorption of the photopolymerization initiator preferably occurs in such wavelength regions. The LEDs which emit UV light may be arranged in one row or a plurality of rows in in a long side direction.

In FIG. 4, a maximum illuminance at a position on the surface of a transported object at a position immediately under the LED (the position of a UV illuminance sensor is 0 (mm)) is referred to as a peak illuminance. Also, an irradiation energy received per unit area is the total quantity of photons reaching the surface "CUMULATIVE LIGHT QUANTITY (mJ/cm$^2$)", which results from the multiplication of a cumulative illuminance (mW/cm$^2$) at each of the wavelengths of the UV irradiating unit described above by an irradiation time (s) ((mV/cm$^2$)×(s)). As the transportation speed of a recording medium being transported is higher, the irradiation time is shorter. That is, when the transportation speed increases and the irradiation time decreases, the "CUMULATIVE LIGHT QUANTITY (mJ/cm$^2$)" which determines the curing property decreases so that the energy-curable liquid is less likely to be cured.

Accordingly, it is preferable to optimize the UV curing resin (cationic polymerizable monomer) or choose a light source which increases the illuminance (mW/cm$^2$) of the UV irradiating unit such that, as a higher-speed unit is used, the cumulative light quantity which cures the energy-curable liquid is smaller. On the other hand, it can be considered that the toner particle 301 is not cured by UV light. As shown in FIG. 4, after irradiated with UV light, the toner particle 301 is included in the cured resin serving as the cured material of the energy-curable liquid.

Next, the result of evaluating a lightness and a chroma in the present embodiment will be described.

First, experiment conditions can appropriately cover a recording liquid viscosity as high as about 0.5 to 50 mPa·s and a resistance as high as about 1×10$^{10}$ to 1×10$^{13}$ Ω·cm.

In each of EXAMPLES/COMPARATIVE EXAMPLES shown below, an output was produced using an image forming device using electrophotography and the color tone of an image was evaluated. As for the color tone, the lightness and the chroma were calculated using a spectral reflectance densitometer for comparison.

The CIE L*a*b* (CIE LAB) used this time is a substantially complete color space and is designed by the International Commission on Illumination (CIE). The CIE LAB can describe substantially all the colors that can be seen by human eyes and is intended to be able to be used as a standard for a device independent model.

The three coordinates of the CIE LAB correspond to the lightness of a color (L*=0 indicates black and L*=100 indicates diffuse white, specular white may be higher), a position between red/magenta and green (a*, negative values indicate colors closer to green, while positive values indicate colors closer to magenta), and a position between yellow and blue (b*, negative values indicate colors closer to blue, while positive values indicate colors closer to yellow). Each of the coordinates has an asterisk (*) to be clearly distinguished from that of the Hunter Lab described later.

From the following expression, a chroma C* was calculated. Note that, for L*, the result from a measuring unit is used.

$$C^* = ((a^*)^2 + (b^*)^2)^{1/2}$$

As the measuring unit, a GretagMacbeth spectrophotometer (available from X-Rite Inc.) was used.

Preferably, the volume-average particle diameter of the toner particles is not less than 0.2 μm and not more than 5 μm. In the present embodiment, toner particles having a volume-average particle diameter of 1 μm were used.

The ratio (PB ratio or P:B) between the pigment (P) and the binder resin (B) as a mass ratio in each of the toner particles is preferably in the range of 1:1 to 1:8. In the present embodiment, the toner particle having a PB ratio of 1:4 was used.

Preferably, the volume-average particle diameter of the pigments is not less than 0.05 μm and not more than 0.400 μm.

In the present embodiment, the pigments having a volume-average particle diameter of 0.075 μm were used.

Preferably, the ratio (TD ratio or T/D×100) between the toner particle (T) and the carrier liquid (energy-curable liquid) (D) is preferably not less than 20% and not more than 80% on a mass scale. In the present embodiment, the toner particle and the carrier liquid having a T/D ratio of 55% were used.

Preferably, the refractive index of the carrier liquid is not less than 1.40 and not more than 1.65. In the present embodiment, the carrier liquid having a refractive index of 1.51 was used.

Preferably, the refractive index between the toner particle and the cured resin is not less than 1.45 and not more than 1.70. In the present embodiment, the toner particle and the cured resin having a refractive index of 1.56 therebetween was used.

Preferably, the film thickness of the cured resin including the toner image on the surface of the recording medium (media) is not less than 0.5 μm and not more than 4 μm in the case where only one color is used. In the present embodiment, the cured resin having a film thickness of 1.5 μm was used.

In the present embodiment, the wavelength of the UV light used for curing was set to 385±5 nm. Using a UV-LED device, the energy at the surface of the recording medium (media) was set to 1400 mW/cm$^2$. The distance between the recording medium and the UV-LED unit was set to 10 mm.

The transportation speed of the recording medium was set to 1000 mm/s. As the recording medium, a coated paper sheet (OKTOP157) was used.

The irradiation width of a UV fixer at the surface of the recording medium was set to about 30 mm. The cumulative energy of UV irradiation was set to 100 mJ/cm². It is assumed that, in the experiment in the present embodiment, there was no pressure-heating fixation (no pressure/heat application).

Preferably, the toner particle has a shape (average circularity) of not less than 0.70 and not more than 0.99. In the present embodiment, the toner particle having an average circularity of 0.98 was used. The carrier liquid (energy-curable liquid) was made to contain 100 ppm of a cationic polymerization inhibitor based on the total mass of the carrier liquid (energy-curable liquid). The viscosity of the recording liquid was adjusted to 5 mPa·s and the resistance thereof was adjusted to $1 \times 10^{11}$ Ω·cm.

In the present invention, the average circularity of the toner particle included in the cured resin is not less than 0.70 and not more than 0.99. The average circularity is preferably not less than 0.80 and not more than 0.99 and more preferably not less than 0.90 and not more than 0.99. The average circularity can be achieved by, e.g., giving an energy to the energy-curable liquid without applying a pressure when the energy curing liquid is cured and a toner image is fixed onto the recording medium.

<Method of Measuring Average Circularity of Toner Particles Included in Cured Resin Included in Recorded Material>

Using a scanning electron microscope (SEM), a cross section of the image on the surface of a paper sheet as the recording medium was observed and the circularity was measured. The following is a specific procedure for obtaining a cross-sectional image. First, output media is wrapped with an epoxy cured resin to be fixed and cut using a microtome to expose the cross section. The cut sample having a thickness of about 5 mm is placed on a double-face conductive tape and imaged using a scanning electron microscope (SEM) JSM-7500F. What is important for imaging is to give the contrast between the developer and the ambient carrier using an acceleration voltage (e.g., 15 kv). Using image processing software (Image-J), a threshold is set and regions for the toner are picked up. By the image processing software, the area and equivalent circle diameter of one particle and the perimeter of one particle are calculated. The circularity in the present embodiment is calculated using the following expression.

Circularity=Perimeter of One Particle/Equivalent Circle Perimeter

As the cross section of the toner particle to be subjected to measurement, a cross section having a largest diameter corresponding to Volume-Average Particle Diameter of Toner Particle±10% is selected and subjected to measurement. The cross sections of 100 toner particles are subjected to measurement and the arithmetic average value of the circularities thereof is used.

Note that, as the recording medium, a transparent or opaque resin film which is used for soft packaging and which does not absorb a liquid can also be used instead of a typical paper sheet. Examples of a resin for the resin film include polyethylene terephthalate, polyester, polyimide, polypropylene, polystyrene, polycarbonate, and the like.

Figure 5:
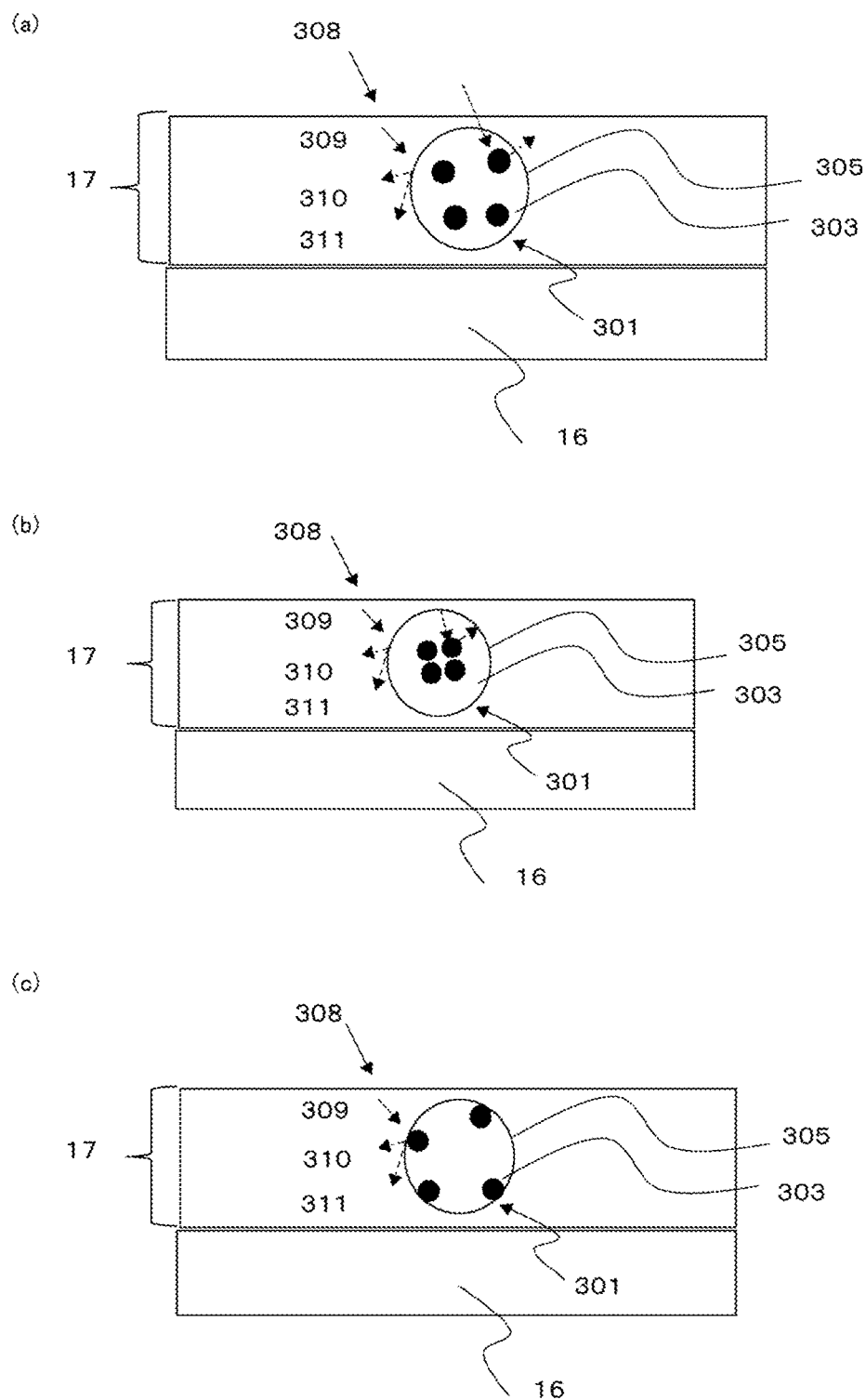
FIGS. 5(a) to 5(c) are conceptual cross-sectional views showing the dispersibility of the pigments included in a toner particle according to EXAMPLE.

FIGS. 5(a) to 5(c) are conceptual cross-sectional views showing the dispersibility (dispersed state) of the pigments (colorant particles color material) 303 included in the toner particle 301.

As described above, to produce a color, the toner particle 301 includes the colorant particles 303. However, when the distribution of the colorant particles 303 differs, the lightness and the chroma vary under the influence of the reflection and scattering of light.

A chroma of less than 40 was evaluated as C. A chroma of not less than 40 and less than 60 was evaluated as B. A chroma of not less than 60 was evaluated as A.

A lightness of less than 30 was evaluated as C. A lightness of not less than 30 and less than 35 was evaluated as B. A lightness of not less than 35 was evaluated as A.

The result is shown in Table 1. In the present embodiment, the chroma and the lightness of not less than B are acceptable.

Note that a method of producing the toner particles is as follows.

The toner particles in EXAMPLES 1-1 to 1-3 were produced in accordance with the "method of producing a developer in EXAMPLE 1" described above.

Note that the content of the pigment dispersant (hydroxyl-group-containing carboxylic acid ester) in the toner particle was set to 15 mass % on the basis of the total mass of the toner particle in EXAMPLE 1-1, to 5 mass % on the basis of the total mass of the toner particle in EXAMPLE 1-2, and to 30 mass % on the basis of the total mass of the toner particle in EXAMPLE 1-3. The pigment dispersant functions to surround each one of the individual pigments and reduce the likeliness of the pigments to come closer to each other.

In the toner particle in EXAMPLE 1-1, the distance between the pigments was uniformly maintained. The pigments neither concentrated at the center of the toner particle nor became excessively close to the wall surface of the toner particle.

In the toner particle in EXAMPLE 1-2, the dispersant was smaller in amount than in EXAMPLE 1-1. Accordingly, the pigments more densely concentrated at the center of the toner particle than in EXAMPLE 1-1.

In the toner particle in EXAMPLE 1-3, the dispersant was larger in amount than in EXAMPLE 1-1. Accordingly, the distance between the pigments was larger than in EXAMPLE 1-1 and the pigments were closer to the wall surface of the toner particle than in EXAMPLE 1-1.

TABLE 1

|  | EXAMPLE 1-1 | EXAMPLE 1-2 | EXAMPLE 1-3 |
| --- | --- | --- | --- |
| FIG. | 5(a) | 5(b) | 5(c) |
| Dispersed State of Pigments | Uniform in Toner Particle | Closer to Center in Toner Particle | Closer to Surface in Toner Particle |
| Chromogenic Property Chroma | A | B | A |
| Chromogenic Property Lightness | A | A | B |

EXAMPLE 1-1

In the toner particle in EXAMPLE 1-1 (FIG. 5(a)), primary incident light passes through the cured resin and reaches the surface of the toner particle as secondary incident light. Due to the refractive index of the surface of the toner particle, i.e., the difference between the refractive index of the material of the surface of the toner particle and the refractive index of the cured resin, the secondary incident light is divided into secondary reflected light, scattered light, and tertiary incident light. When the light reaches the colorant particles, the light is absorbed or reflected depending on the property of a color. When the dispersed state of the colorant particles was uniform, the light evenly reached the colorant particles so that chroma increased. In addition, since the probability of the light passing through the gaps between the colorant particles and reaching the base was high, the lightness also increased.

EXAMPLES 1-2 and 1-3 and COMPARATIVE EXAMPLE 1

In the toner particle in EXAMPLE 1-2 (FIG. 5(b)), the probability of light passing through the gaps between the colorant particles and reaching the base was high so that the lightness was high. However, since the light was less likely to reach the surfaces of the colorant particles, the chroma was lower than that in the toner particle in EXAMPLE 1-1.

In the toner particle in EXAMPLE 1-3 (FIG. 5(c)), light was likely to come in contact with the surfaces of the colorant particles so that the chroma increased. However, since the light was less likely to reach the base, the lightness was lower than in the toner particle in EXAMPLE 1-1.

Using FIG. 6, a description will be given of the relationship between the toner particle and the cured resin after curing with UV light.

Figure 6:
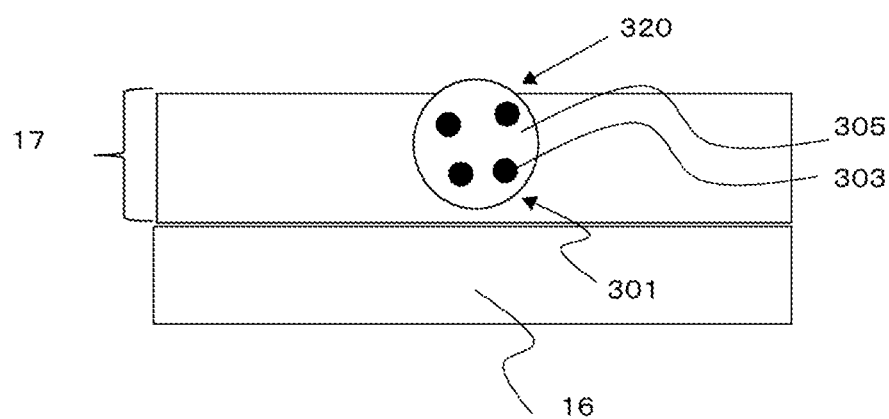
FIG. 6 is a cross-sectional view of an exposed toner particle according to COMPARATIVE EXAMPLE 1.

Note that the recorded material in FIG. 6 in COMPARATIVE EXAMPLE 1 was obtained by producing an output using the image forming device using electrophotography, allowing the output to stand for 1 hour before curing with UV light, and vaporizing the carrier liquid in EXAMPLE 1-1.

Since UV light cures substantially only the energy-curable liquid, the influence exerted by the UV light on the toner particle is small. Consequently, when the toner particle 301 is exposed from the cured resin 17 (exposed portion 320), roughness is produced in the surface of an image.

The result of the experiment is described using Table 2.

<Amount of Exposure>

A cross section of the image on the surface of a paper sheet as the recording medium was observed. The following is a specific procedure for obtaining a cross-sectional image.

Using a scanning electron microscope (SEM), a cross section of the image on the surface of the paper sheet as the recording medium was observed and the amount of exposure was measured. The following is a specific procedure for obtaining a cross-sectional image. First, an output media is wrapped with an epoxy cured resin to be fixed and cut using a microtome to expose the cross section. The cut sample having a thickness of about 5 mm is placed on a double-face conductive tape and imaged using the scanning electron microscope (SEM) JSM-7500 F. In this manner, the state of the cross section of the image can be observed.

Using the image processing Image-J, the contour of the toner particle is described. Then, the interface of the surface of the image is plotted and a moving average line is calculated from the plots. Then, the area (exposed area) of the portion of the toner particle which is located outside the moving average line described above is calculated. When the area (exposed area) outside the moving average line was not less than 10% of the area of the toner particle, it was determined that the toner particle was exposed from the surface of the cured resin. Note that, as the toner to be subjected to the measurement, 100 toner particles present on the interface of the surface of the image were selected and the arithmetic average value of the exposed area was used.

<Gloss>

Using a glossmeter (HANDY GLOSSMETER PG-1 available from NIPPON DENSHOKU INDUSTRIES Co., LTD.), the gloss (gloss level) of the image was measured at a 60-degree incidence angle. When the gloss (gloss level) was not less than 30 degrees, the gloss was evaluated as "A". When the gloss (gloss level) was less than 30 degrees, the gloss was evaluated as "C". The chroma and the lightness are the same as described above.

TABLE 2

|  | EXAMPLE 1-1 | COMPARATIVE EXAMPLE 1 |
| --- | --- | --- |
| FIG. | 5(a) | 6 |
| Exposure | Not Observed | Observed |
| Chromogenic Property Chroma | A | A |
| Chromogenic Property Lightness | A | B |
| Gloss | A | C |

Since the experiment/evaluation conditions are the same in Table 1, the description thereof is omitted.

The recording medium (media) was an OKTOP coated paper sheet and the surface roughness (ten-point average roughness) Rz of the recording medium was 2 µm. As a result of forming an image on the recording medium and evaluating the image, in COMPARATIVE EXAMPLE 1 in which the amount of exposure was large, the gloss deteriorated.

In EXAMPLE 1-1, Rz was about 2 µm, which was substantially the same as the surface roughness of the recording medium. In short, the gloss was about 35 degrees.

In COMPARATIVE EXAMPLE 1 (FIG. 6), Rz increased to about 3.5 µm and the gloss deteriorated to 10 degrees so that the difference between the gloss of a white portion and the gloss of an image portion increased. That is, what is important is that the toner particle is not exposed from the surface of the cured resin. In other words, what is important is that the toner particle is included in the cured resin.

To prevent the toner particle from being exposed from the surface of the cured resin, it is preferable to cause curing without vaporizing the carrier liquid. That is, it is desirable to minimize the amount of the carrier liquid vaporized into the atmosphere or reduce the time from the formation of the toner image to the curing with the UV light. On the other hand, when heat and pressure is used as used in the prior art, the carrier liquid is likely to be vaporized so that the toner particle tends to be exposed.

EXAMPLE 1-4, COMPARATIVE EXAMPLE 2

Figure 7:
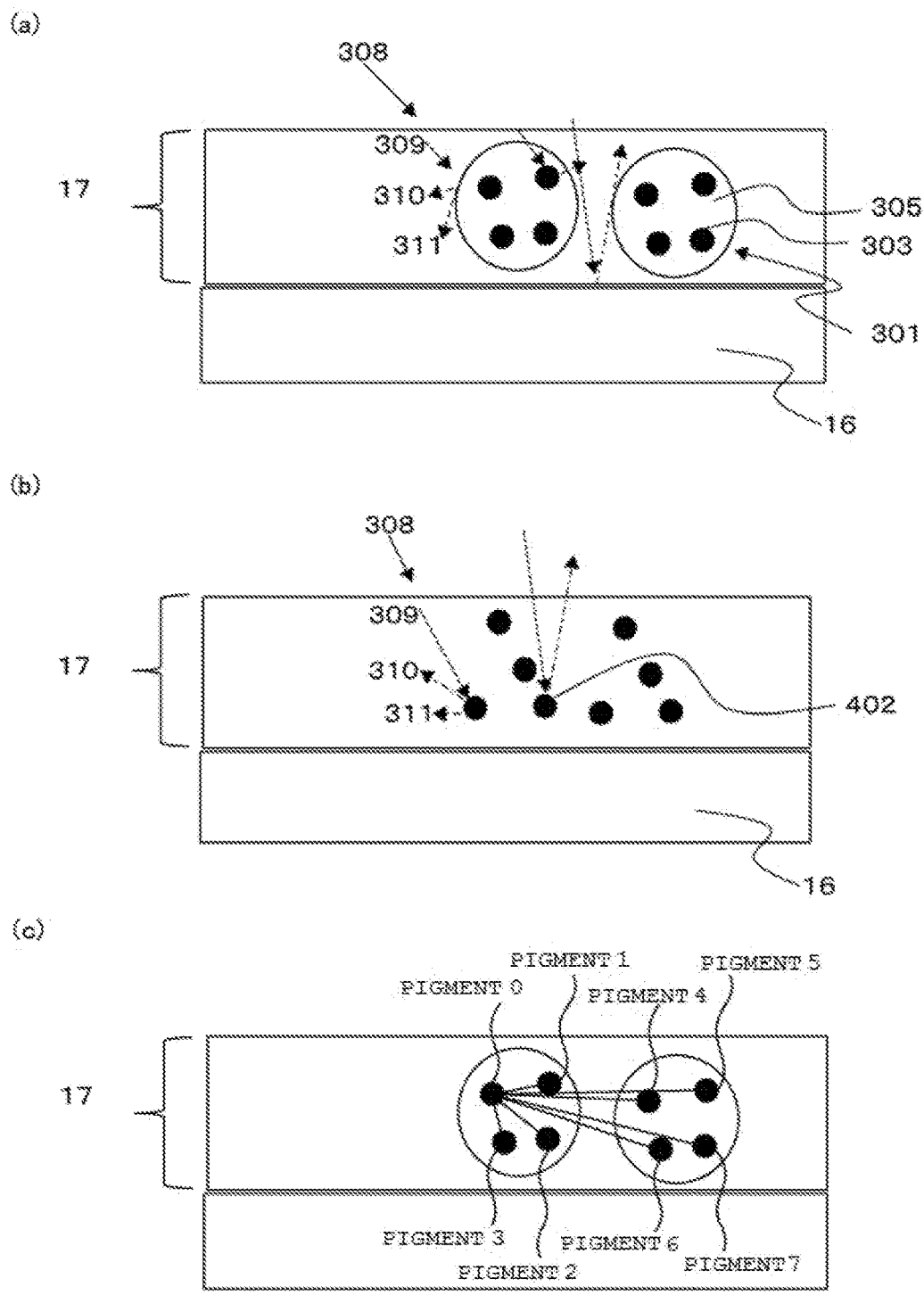
FIG. 7(a) is a conceptual cross-sectional view showing an aspect in which a toner particle includes pigments.
FIG. 7(b) is a conceptual view showing an aspect in which pigments are dispersed directly in a cured resin.
FIG. 7(c) is a conceptual view showing the distance between toner particles.

Next, using FIG. 7, a description will be given of the characteristic features of a method in which the toner particle includes the pigments.

In general, in the images output from an offset printer and a UV ink jet machine, a toner particle (and the binder resin thereof) does not exist and pigments are dispersed directly in a cured resin such as a carrier, as shown in FIG. 7(b). Table 3 shows the results of evaluating a chromogenic property in such a case.

Note that a recorded material in EXAMPLE 1-4 was obtained in the same manner as in EXAMPLE 1-1 except that Pigment Blue 15:3 was used as the pigments.

COMPARATIVE EXAMPLE 2 in FIG. 7(b) was obtained by applying the carrier liquid, the pigment dispersant, and Pigment Blue 15:3 as the pigments each used in EXAMPLE using a select-coater (film thickness 15 μm: OSP-1.5 #0.7 PO. 08H4S 1.5 available from MATSUO SANGYO CO., LTD.) without using an image forming device employing electrophotography and curing the resulting coating with UV light.

<Dispersed State>

Using the SEM described above, a cross section of an image was subjected to measurement. The respective center positions of the pigments (cyan pigments) were detected and the distance between the individual pigments (the distance between the first and second cyan pigments, the distance between the first and third cyan pigments, the distance between the second and third cyan pigments, . . . ) was measured. The histogram of a frequency versus the distance was calculated and the dispersion was calculated.

<Dispersibility of Pigments>

For example, it is assumed that the particle diameter of the toner particle is 1 μm, the particle diameter of the pigment is 0.1 μm, and the total number of the pigments is 8.

In the case where the pigments are dispersed in an island-like configuration, as shown in FIG. 7(c), four pigments (pigments 0 to 3) and pigments 4 to 7 are disposed in one toner. The distances therebetween were calculated on the basis of the pigment 0. The average value was 0.79 μm and the standard deviation was 0.47.

On the other hand, when the eight pigments were uniformly dispersed in the same area as in the case where the pigments are dispersed in the island-like configuration, when the distances were similarly calculated on the basis of the pigment 0, the average value was 0.57 μm and the standard deviation was 0.18.

By thus performing analysis, it is possible to quantify and evaluate the dispersibility of the pigments.

|  | (A) | (B) |
|---|---|---|
| Distance between Pigments 0 and 1 | 0.25 | 0.35 |
| Distance between Pigments 0 and 2 | 0.40 | 0.45 |
| Distance between Pigments 0 and 3 | 0.25 | 0.35 |
| Distance between Pigments 0 and 4 | 1.00 | 0.70 |
| Distance between Pigments 0 and 5 | 1.25 | 0.75 |
| Distance between Pigments 0 and 6 | 1.10 | 0.70 |
| Distance between Pigments 0 and 7 | 1.25 | 0.70 |
| Distance between Pigments (Average Value) | 0.79 | 0.57 |
| Distance between Pigments (Standard Deviation) | 0.47 | 0.18 |

(A) indicates the distance when Pigments are Dispersed in Island-Like Configuration (μm)
(B) indicates the distance when Pigments are Uniformly Dispersed (μm)
Conditions for Island-Like Dispersion: When the particle diameter of each of the toner particles is 1 μm, the number of the pigments per toner particle is 4, and the number of the toner particles is 2
Conditions for Uniform Dispersion: When the number of the pigments is 8 and the pigments are uniformly dispersed in the same area as when the pigments are dispersed in the island-like configuration Experiment/evaluation conditions are the same as in Table 1 so that a description thereof is omitted.

TABLE 3

|  | EXAMPLE 1-4 | COMPARATIVE EXAMPLE 2 |
|---|---|---|
| FIG. | 7(a) | 7(b) |
| Dispersed State of Pigments | Uniform (Island-Like) | Uniform |
| Chromogenic Property Chroma | A | A |
| Chromogenic Property Lightness | A | B |

In COMPARATIVE EXAMPLE 2, a chroma substantially equal to that in EXAMPLE 1-4 in which the toner particle includes the colorant particles was obtained.

However, in COMPARATIVE EXAMPLE 2, light was less likely to reach the base than in EXAMPLE 1-4 so that the lightness did not increase.

Thus, in EXAMPLE 1-4, by using the toner particles in which the colorant particles are included in the binder resin and locating the toner particles in an island-like configuration in the cured resin, it is possible to further increase the lightness and the chroma.

EXAMPLE 1-5, COMPARATIVE EXAMPLE 3

<Shape of Toner Particle>

Using FIG. 8, a description will be given of the case where the toner particle was deformed after fixation.

The cross-sectional view of the recorded material in EXAMPLE 1-5 in FIG. 8(a) was obtained in the same manner as in EXAMPLE 1-1.

FIG. 8(a) shows the case where the toner was not deformed. FIG. 8(b) shows the case where the toner was deformed by heat or pressure. Note that COMPARATIVE EXAMPLE 3 in FIG. 8(b) is an example in which the recorded material obtained in EXAMPLE 1-1 was fed through a rigid-body heat roller and a pressure roller at a temperature of 150° C., under a total pressure g of 100 N, at a longitudinal width of 325 mm, and at a nip width of 8 mm.

The changed shape was evaluated using an average circularity as an index. The result of the experiment is shown in Table 4. Note that a method of measuring the average circularity is as described above.

In Table 4, the differences between the foregoing average circularities were compared to each other. Each of the differences is the change rate of the circularity obtained from a cross section of an image to the circularity of the toner in a refill bottle.

For example, in the case of EXAMPLE 1-5, the circularity in the refill bottle was 0.98, while the circularity in the cross-sectional shape was 0.97, so that the change rate was about 2%. On the other hand, in COMPARATIVE EXAMPLE 3 in which heat/pressure was applied, the circularity decreased to 0.68 so that a 31% rate reduction was observed.

In the present embodiment, when the change rate was less than 15%, it was determined that the shape of the toner was maintained and, when there was a 15% or more change, it was determined that the toner was deformed.

TABLE 4

|  | EXAMPLE 1-5 | COMPARATIVE EXAMPLE 3 |
|---|---|---|
| FIG. | 8(a) | 8(b) |
| Shape of Toner Particle | Maintained | Deformed |
| Chromogenic Property Chroma | A | A |

TABLE 4-continued

|  | EXAMPLE 1-5 | COMPARATIVE EXAMPLE 3 |
| --- | --- | --- |
| Chromogenic Property Lightness | A | B |

As shown in Table 4, when the toner particle is deformed, the distance between the colorant particles is shortened. Accordingly, the chroma increases, while the lightness decreases. That is, by maintaining the shape of the toner particle so as to prevent the distance between the colorant particles from being shortened beyond a given value, the lightness and the chroma can be increased.

Figure 11:
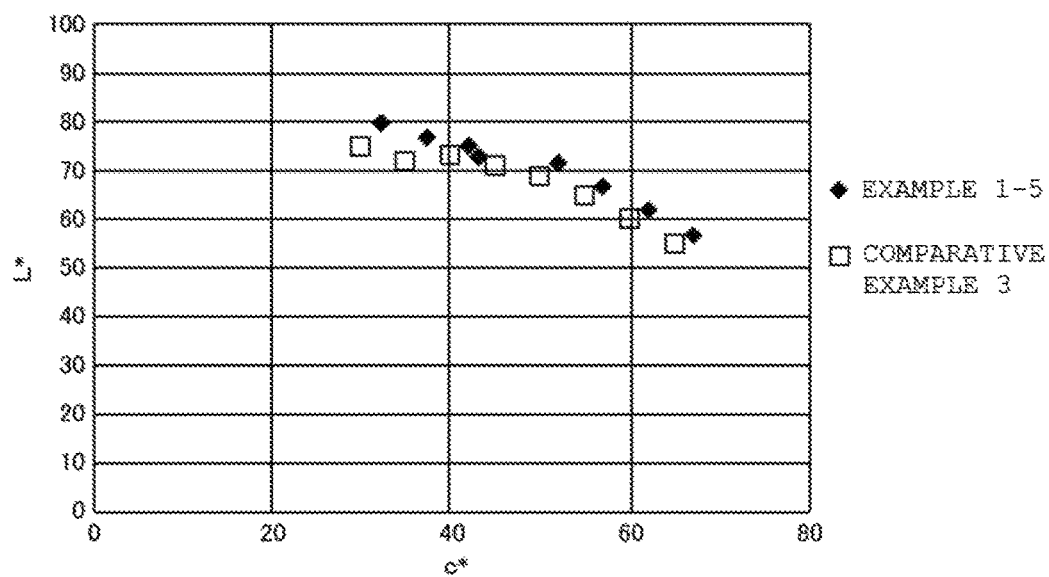
FIG. 11 is a view showing experimental data on a lightness and a chroma.

FIG. 11 shows the experiment data of the lightness and the chroma. Each of the points in FIG. 11 shows the result of measurement obtained under the following conditions.

Figure 8:
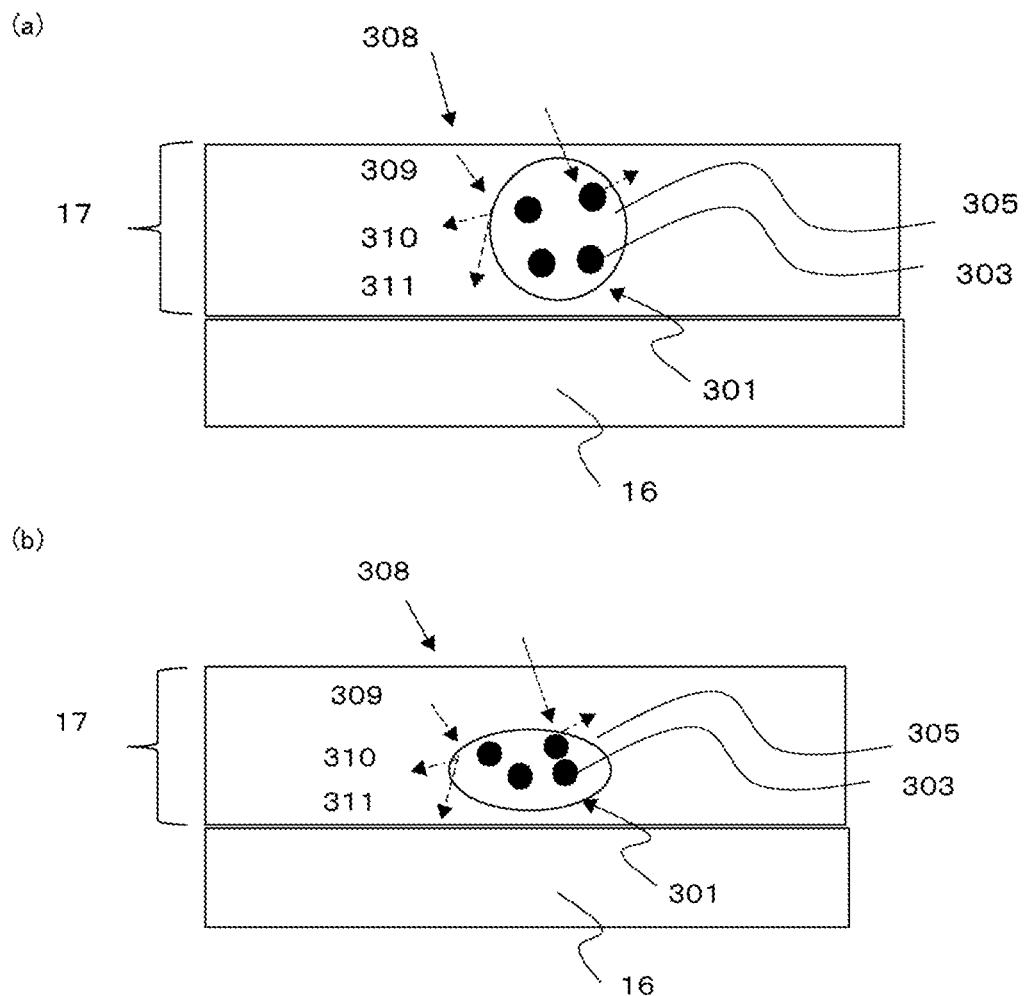
FIGS. 8(a) and 8(b) are conceptual cross-sectional views showing the shapes of toner particles for comparison.

Average Volume Particle Diameter of Toner particles: 1 μm
PB Ratio (P:B): 1:4
Volume-Average Particle Diameter of Pigments: 0.075 μm
TD Ratio: 55%
Refractive Index: 1.51
Refractive Index of Binder Resin of Toner Particles: 1.56
Film Thickness of Media: 1.5 μm As shown in FIG. 11, in EXAMPLE 1-5, when the chroma was in a range of about 50 to 65, a higher lightness could be achieved with the same chroma than in COMPARATIVE EXAMPLE 3 (FIG. 8 (b)).

Even when the chroma was not more than 50 and not less than 65, the same tendency could be recognized.

Thus, the state where the colorant particles are dispersed in an island configuration in the toner particle, while the shape of the toner particle is maintained, and the toner particle is included in the cured resin and is not exposed to the outside of the cured resin has the effect of further increasing the lightness and the chroma. Note that the values in the present example are only illustrative and are preferably optimized under each of the set conditions.

EXAMPLE 2

EXAMPLES 2-1, 2-2, and COMPARATIVE EXAMPLE 4

Next, a description will be given of examples related to the distance between the respective wall surfaces (minimum distance between the wall surfaces) of individual toner particles.

Figure 9:
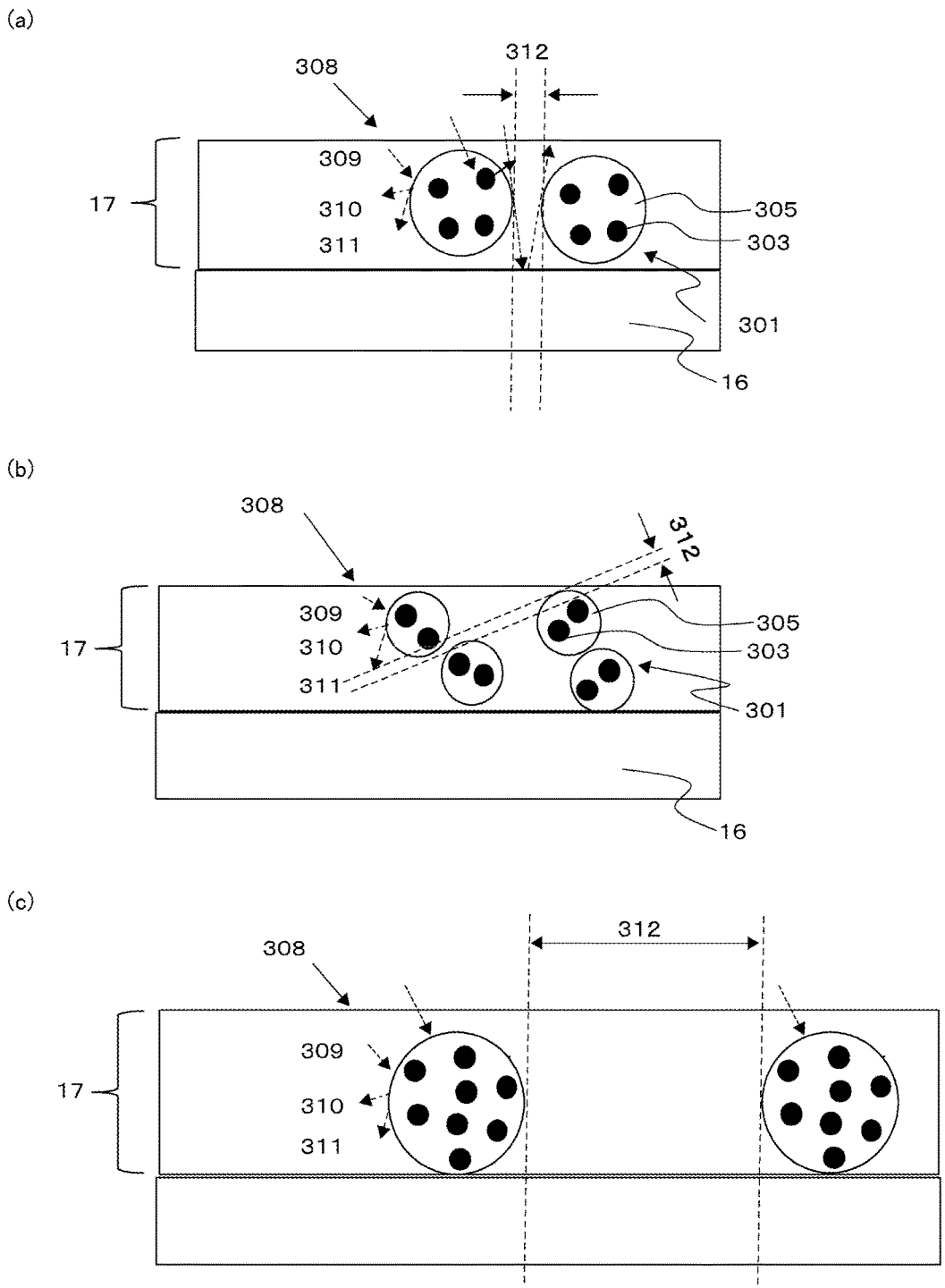
FIGS. 9(a) to 9(c) are conceptual views of the distance between the wall surfaces of toner particles according to EXAMPLE 2.

FIGS. 9(a) to 9(c) are cross sections when the particle diameters of the toner particles were changed in the state where the quantity of the colorant particles per unit area was equal. 312 shows the distances between the respective wall surfaces of the toner particles. Table 5 shows the result of evaluating the lightness and the chroma in the same manner as in EXAMPLE 1.

(Method of Producing Recorded Material in Each of Examples 2-1, 2-2 and Comparative Example 4)

In the same manner as in EXAMPLE 1, an image was output using electrophotography. The method of producing the developer was as described above. Since the toner particle dispersant contributes to particle formation, by varying the content of the toner particle dispersant, the diameter and circularity of the particle can be controlled. Examples of a commercially available product of the foregoing toner particle dispersant include AJISPER PB-817 (available from AJINOMOTO Fine-Techno Co., Inc.) Solsperse 11200, 13940, 17000 and 18000 (available from Lubrizol Japan Limited), and the like.

In the present example, in the developer in EXAMPLE 1, 5 parts by mass of the toner particle dispersant in FIG. 9(a) (EXAMPLE 2-1), 0.5 parts by pass of the toner particle dispersant in FIG. 9(b) (EXAMPLE 2-2), and 20 parts by mass of the toner particle dispersant in FIG. 9(c) (COMPARATIVE EXAMPLE 4) were added to 100 parts by mass of the binder resin to produce developers.

<Particle Diameter of Toner Particle>

In each of the cross-sectional images of the toner particles obtained in such a manner as described above, the toner particles were irradiated with light using a particle shape/diameter analyzing device FPIA-3000 available from Sysmex Corporation. From the detected value, a cross-sectional area was measured and the volume-average particle diameters of 500 toner particles were calculated.

The volume-average particle diameter of the toner particles which was not less than 1 μm was evaluated to be "Large". The volume-average particle diameter of the toner particles which was not less than 0.5 μm and less than 1 μm was evaluated to be "Intermediate". The volume-average particle diameter of the toner particles which was less than 0.5 μm was evaluated to be "Small".

<Quantity of Pigments>

As described above, using a SEM, the cross-sectional images of the toner particles were obtained. The areas occupied by the pigment particles relative to the cross-sectional areas were measured and the quantities of the pigments were calculated.

When the value calculated from Expression (2) shown below was not less than 30%, the value was evaluated to be "Large". When the value calculated from Expression (2) shown below was not less than 10% and less than 30%, the value was evaluated to be "Intermediate. When the value calculated from Expression (2) shown below was less than 10%, the value was evaluated to be "Small".

$$S_{pigments}/S_{toner} \qquad \text{(Expression 2)}$$

wherein $S_{pigments}$ represents the total (average value) of the cross-sectional areas of the plurality of pigments included in one toner particle, and $S_{toner}$ represents the cross-sectional area (average value) of one toner particle.

<Distance Between Wall Surfaces>

Using a scanning electron microscope (SEM), a cross section of the image on the surface of a paper sheet as the recording medium was observed and the distance between the wall surfaces was measured. The following is a specific procedure for obtaining a cross-sectional image.

First, output media is wrapped with an epoxy cured resin to be fixed and cut using a microtome to expose the cross section. The cut sample having a thickness of about 5 mm is placed on a double-face conductive tape and imaged using the scanning electron microscope (SEM) JSM-7500 F. What is important for imaging is to give the contrast between the developer and the ambient carrier using an acceleration voltage (e.g., 15 kv). Using image processing software (image-J), a threshold is set and regions for the toner are picked up.

By the image processing software, the area and equivalent circle diameter of one particle and the center coordinates of the equivalent circle diameter of one particle in the window of the imaging software are calculated. For particles adjacent to each other, the center coordinates are similarly calculated. Then, the individual center coordinates are connected (center line). The outer peripheral points of the equivalent circuit diameter intersecting the center line are plotted. The distance between the plots for the adjacent particles is assumed to be the distance between the wall surfaces. The distance between the walls surfaces described above is measured in the window in the software. The distances between the wall surfaces of 100 adjacent pairs of the particles are measured and the arithmetic average value thereof is used.

The average distance between the wall surfaces which was less than 75 nm was evaluated to be "Small". The average distance between the wall surfaces which was not less than 75 nm and less than 125 nm was evaluated to be "Intermediate". The average distance between the wall surfaces which was not less than 125 nm and less than 150 nm was evaluated to be "Large".

<Film Thickness>

Using a SEM, a cross section of the toner particle was observed and the average values of the distances from the recording medium to the upper surface of the cured material of the developer (recording liquid) were calculated.

The film thickness which was not less than 2 μm was evaluated to be "Large". The film thickness which was not less than 1 μm and less than 2 μm was evaluated to be "Intermediate". The film thickness which was less than 1 μm was evaluated to be "Small".

TABLE 5

| | EXAMPLE 2-1 | EXAMPLE 2-2 | COMPARATIVE EXAMPLE 4 |
|---|---|---|---|
| FIG. | 9(a) | 9(b) | 9(c) |
| Volume-Average Particle Diameter of Toner Particles | Intermediate | Small | Large |
| Quantity of Pigments per Toner Particle | Intermediate | Small | Large |
| Average Distance between Wall Surfaces of Adjacent Toner Particles | Intermediate | Small | Large |
| Film Thickness | Intermediate | Small | Large |
| Chromogenic Property Chroma | A | A | B |
| Chromogenic Property Lightness | A | B | A |

As shown in Table 5, when the average of the respective distances 312 between the wall surfaces of the toner particles is small, the chroma is high, but the lightness tends to decrease.

On the other hand, when the average of the distances 312 between the wall surfaces of the toner particles is large, the lightness is high, but the chroma tends to decrease. Thus, it has been found that the average distance between the wall surfaces of the toner particles has an appropriate value.

Figure 12:
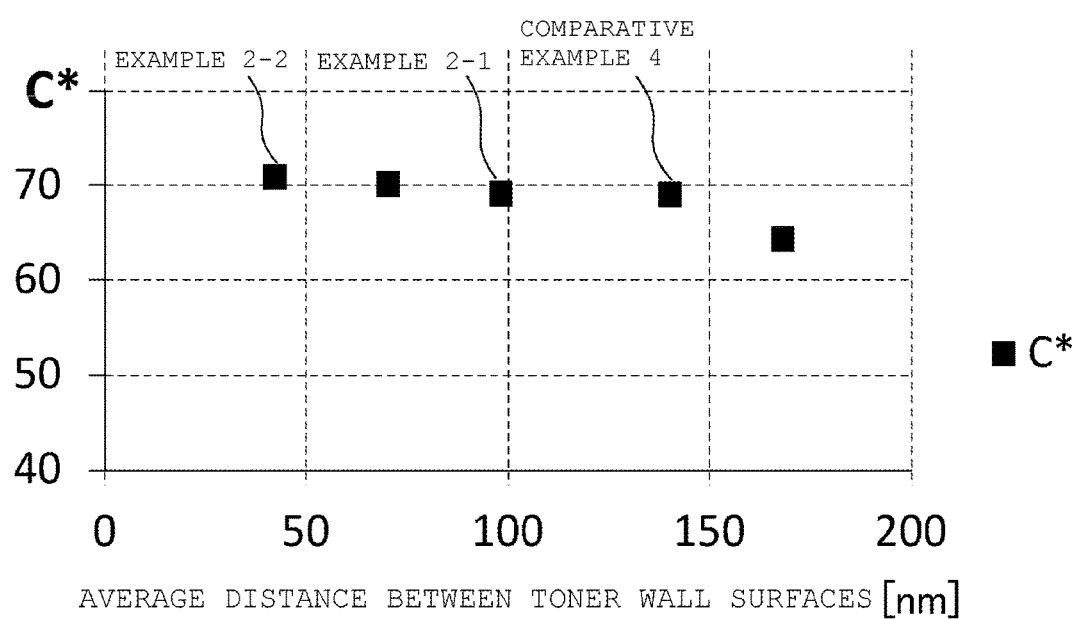
FIG. 12 is a view showing the relationship between an average distance between the wall surfaces of toner particles and the chroma.

FIG. 12 shows the result of conducting, in EXAMPLES 2-1, 2-2 and COMPARATIVE EXAMPLE 4, the same study as conducted in EXAMPLE 1. It can be seen that, as the average distance between the wall surfaces of the toner particles increases, the chroma decreases. Thus, the average distance between the wall surfaces of the particles is preferably less than 125 nm. With regard to the minimum value of the distance between the wall surfaces of the toner particles, the mechanical barrier of the surface of the toner particle included in the energy-curable liquid is mostly about not less than 10 nm on average (The average size of the charge control agent attached to the surface of the toner particle is mostly about 10 nm.). Accordingly, the average distance between the wall surfaces of the adjacent toner particles is preferably not less than 10 nm. A more preferable average distance between the wall surfaces of the adjacent toner particles is not less than 75 nm and less than 125 nm.

The distance between the wall surfaces can be controlled in two types of directions. For example, by increasing the amount of the toner relative to the carrier, the bulk density is increased to reduce the distance between the wall surfaces. Conversely, by reducing the amount of the toner relative to the carrier liquid, the distance between the wall surfaces can be increased. For example, when the amount of the toner and the carrier is D and the amount of the toner is T (mass %), the distance between the wall surfaces at a 75% TD ratio is 10 nm and the distance between the wall surfaces at a 66% TD ratio is 200 nm.

Figure 13:
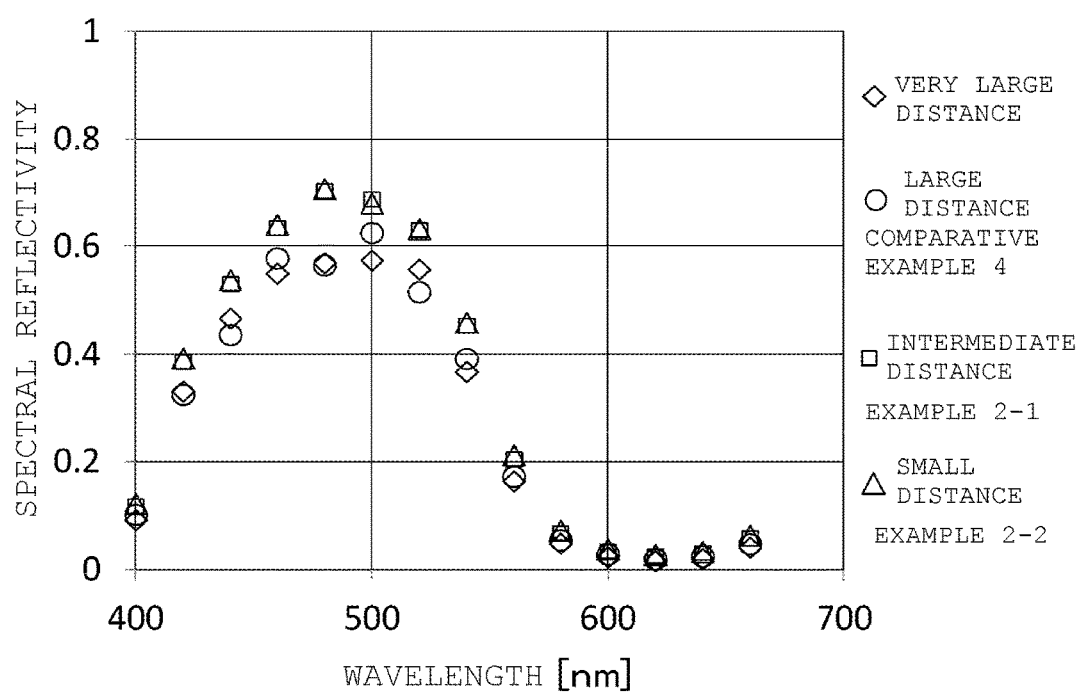
FIG. 13 is a view showing the influence of the average distance between the wall surfaces of toner particles on a spectral reflectivity.

FIG. 13 shows a spectral sensitivity (spectral reflectivity) at each of the distances.

Using a GretagMacbeth spectrophotometer (available from X-Rite Inc.), the reflectivity at each of wavelengths was measured.

The average distance between the wall surfaces which was 170 nm was evaluated to be "Very Large". The average distance between the wall surfaces which was 140 nm (COMPARATIVE EXAMPLE 4) was evaluated to be "Large". The average distance between the wall surfaces which was 100 nm (EXAMPLE 2-1) was evaluated to be "Intermediate". The average distance between the wall surfaces which was 40 nm (EXAMPLE 2-2) was evaluated to be "Small".

It can be seen that, in the same manner as in FIG. 12, the distributions of an absorptivity and the reflectivity vary depending on the average distance between the wall surfaces of the toner particles. It is obvious that, particularly at wavelengths of about 420 to 540 nm, the reflectivities when the average distance between the wall surfaces is "Large" and "Very Large" are significantly lower than the reflectivities when the average distance between the wall surfaces is "Small" and "Intermediate".

EXAMPLES 2-4 to 2-6

Figure 10:
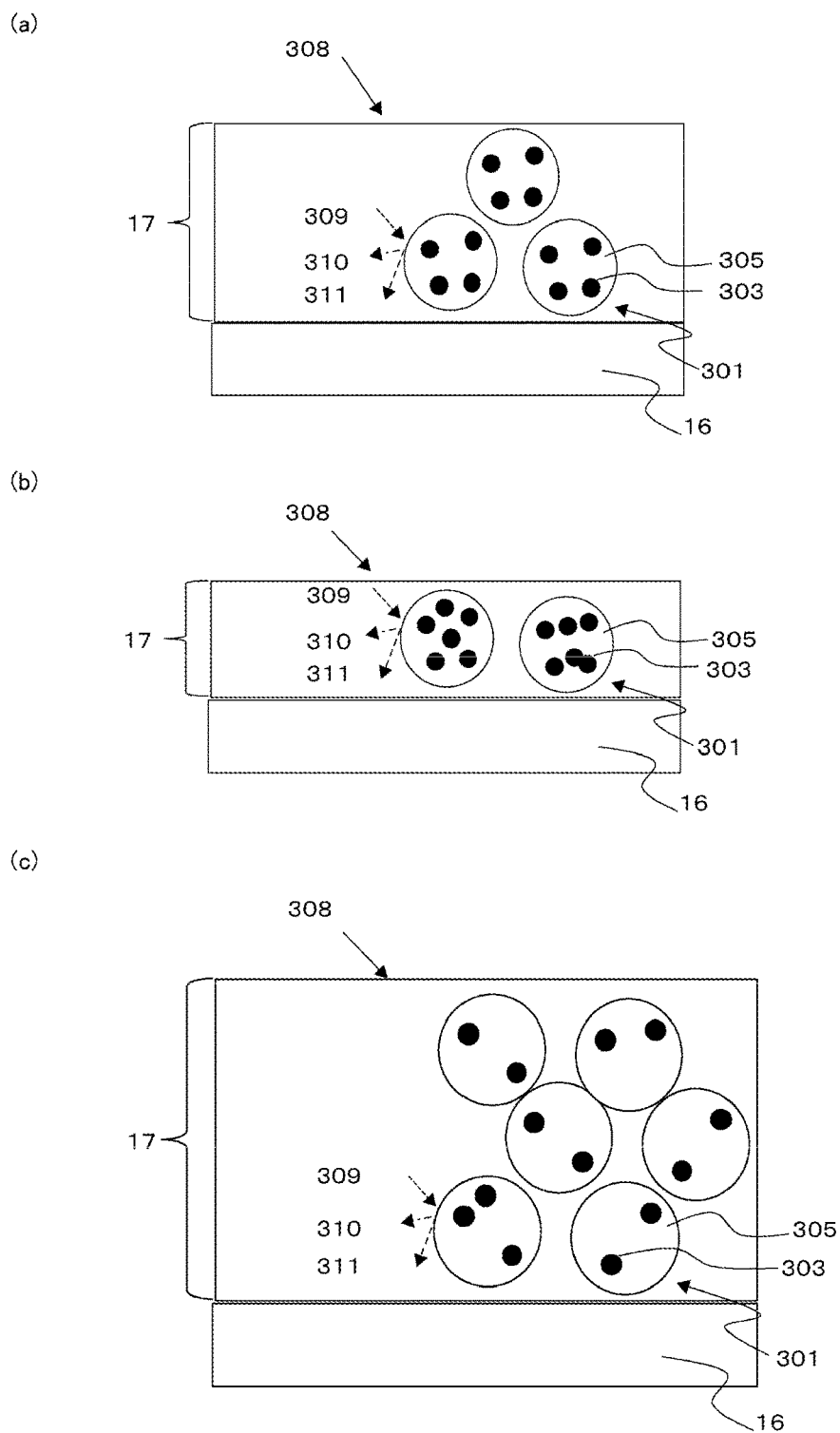
FIGS. 10(a) to 10(c) are conceptual views of the distance between colorant particles according to EXAMPLE 2.

Using FIG. 10, a description will be given of the chromogenic property when the quantity of the colorant particles is varied. Whether the chromogenic property is superior or inferior is substantially determined by the quantity of the pigments per unit area. When the quantity of the colorant particles included in each one of the toner particles has decreased, by increasing the film thickness such that the toner particles are present in multiple layers, appropriate color production can be ensured. However, the presence of the toner particles in the multiple layers is disadvantageous in that the amounts of the consumed binder resin and the consumed cured resin (curable liquid) increase.

Examples of Production of Recorded Materials in Examples 2-4 to 2-6

In EXAMPLES 2-4 to 2-6, recorded materials were produced in the same manner as in EXAMPLE 1-1 except that 20 parts by mass, 25 parts by mass, and 10 parts by mass of the pigments were used in EXAMPLES 2-4, 2-5, and 2-6, respectively, on the basis of 100 parts by mass of the binder resin used in EXAMPLE 1.

Table 6 shows the result of the experiment in the cases where the quantity of the pigments per toner particle was large (FIG. 10(b)) and where the quantity of the pigments per toner particle was small (FIG. 10(c)).

TABLE 6

|  | EXAMPLE 2-4 | EXAMPLE 2-5 | EXAMPLE 2-6 |
| --- | --- | --- | --- |
| FIG. | 10(a) | 10(b) | 10(c) |
| Volume-Average Particle Diameter of Toner Particles | Intermediate | Intermediate | Intermediate |
| Quantity of Pigments per Toner Particle | Intermediate | Large | Small |
| Average Distance between Wall Surfaces of Adjacent Toner Particles | Intermediate | Intermediate | Intermediate |
| Film Thickness | Intermediate | Small | Large |
| Chromogenic Property Chroma | A | A | A |
| Chromogenic Property Lightness | A | B | A |

As shown in EXAMPLE 2-6 in Table 6, in the case where the quantity of the pigments included in one toner particle was small, the film thickness was adjusted to be large and the toner particles were provided in multiple layers. This allowed improvements in chroma and lightness.

Thus, even when the film thickness is varied in accordance with the quantity of the pigments included in one toner particle, by setting the average distance between the respective wall surfaces of the toner particles to a value in a predetermined range, the lightness and the chroma can be maintained at a high level.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-107667, filed May 27, 2015, which is hereby incorporated by reference herein in its entirety.

REFERENCE SIGNS LIST

11 IRRADIATING UNIT
15 RECORDING LIQUID
16 RECORDING MEDIUM
17 CURED RESIN
20 PHOTOSENSITIVE DRUMS
30 CHARGING UNITS (PRIMARY CHARGERS)
40 EXPOSURE LIGHT
61 PRIMARY TRANSFER ROLLERS
70 TRANSFER UNIT (INTERMEDIATE TRANSFER BELT)
80 TRANSFER BELT
81 SECONDARY TRANSFER OUTER ROLLER
86 SECONDARY TRANSFER INNER ROLLER
301 TONER PARTICLE
302 ENERGY-CURABLE LIQUID (CARRIER LIQUID)
303 COLORANT PARTICLE (COLOR MATERIAL)
305 BINDER RESIN
308 PRIMARY INCIDENT LIGHT
309 SECONDARY INCIDENT LIGHT
310 SECONDARY REFLECTED LIGHT
311 SECONDARY SCATTERED LIGHT
312 DISTANCE BETWEEN WALL SURFACES OF TONER PARTICLES
320 EXPOSED PORTION

The invention claimed is:

1. A recorded material, comprising:
   a recording medium; and
   a fixed toner image on the recording medium, the fixed toner image comprising a cured resin and a toner particle in the cured resin, the toner particle including colorant particles, wherein
   the cured resin is formed from an energy-curable liquid comprising a cationic polymerizable monomer included in a carrier liquid, the cationic polymerizable monomer being at least one compound selected from the group consisting of dodecyl vinyl ether, dipropylene glycol divinyl ether, dicyclopentadiene vinyl ether, cyclohexane dimethanol divinyl ether, tricyclodecane vinyl ether, trimethylolpropane trivinyl ether, 2-ethyl-1,3-hexanediol divinyl ether, 2,4-diethyl-1,5-pentanediol divinyl ether, 2-butyl-2-ethyl-1,3-propanediol divinyl ether, neopentyl glycol divinyl ether, pentaerythritol tetra vinyl ether, and 1,2-decanediol divinyl ether,
   an average circularity of the toner particle is 0.70 to 0.99 and the toner particle is not exposed from a surface of the cured resin,
   a ratio (T/D×100) between the toner particle (T) and the carrier energy-curable liquid (D) is 20 to 80 on a mass scale,
   a volume-average particle diameter of the toner particle is not less than 0.5 μm and less than 1 μm, and
   an average distance between wall surfaces of adjacent toner particles in the cured resin is not less than 75 nm and less than 125 nm.

2. The recorded material according to claim 1, wherein each of the colorant particles is a pigment.

3. An image forming method to obtain the recorded material according to claim 1, comprising:
   an electrostatic latent image forming step of forming an electrostatic latent image on an image carrier;
   a developing step of developing the electrostatic latent image using a recording liquid including the energy-curable liquid and the toner particle including colorant particles, to form a toner image formed of the toner particle including colorant particles on the image carrier;
   a transfer step of transferring the toner image formed of the toner particle including colorant particles and the energy-curable liquid from the image carrier onto the recording medium; and
   a fixing step of obtaining the recorded material by fixing the toner image onto the recording medium without applying a pressure thereto, by giving an energy to the energy-curable liquid to cure the energy-curable liquid to form the cured resin.

4. The image forming method according to claim 3, wherein the energy-curable liquid is a UV-curable liquid, and
   the fixing step is a step of obtaining the recorded material by fixing the toner image onto the recording medium by irradiating the energy-curable liquid with UV light to cure the energy-curable liquid to form the cured resin without applying a pressure thereto.

5. The image forming method according to claim 3, wherein each of the colorant particles is a pigment.

* * * * *